US010030081B2

United States Patent
Kitade et al.

(10) Patent No.: US 10,030,081 B2
(45) Date of Patent: Jul. 24, 2018

(54) METHOD FOR PRODUCING (METH)ACRYLIC RESIN COMPOSITION

(71) Applicant: KURARAY CO., LTD., Kurashiki-shi (JP)

(72) Inventors: Yasuhito Kitade, Tainai (JP); Hiroshi Ozawa, Tainai (JP); Shouji Tanaka, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 0 days.

(21) Appl. No.: 15/501,586

(22) PCT Filed: Aug. 6, 2015

(86) PCT No.: PCT/JP2015/072399
§ 371 (c)(1),
(2) Date: Feb. 3, 2017

(87) PCT Pub. No.: WO2016/021694
PCT Pub. Date: Feb. 11, 2016

(65) Prior Publication Data
US 2017/0226237 A1    Aug. 10, 2017

(30) Foreign Application Priority Data

Aug. 6, 2014 (JP) ................................. 2014-160672

(51) Int. Cl.
*C08F 6/28* (2006.01)
*C08K 5/101* (2006.01)
*C08K 5/09* (2006.01)

(52) U.S. Cl.
CPC .................. *C08F 6/28* (2013.01); *C08K 5/09* (2013.01); *C08K 5/101* (2013.01)

(58) Field of Classification Search
CPC .............. C08F 6/28; C08K 5/101; C08K 5/09
(Continued)

(56) References Cited

U.S. PATENT DOCUMENTS 5,898,055 A * 4/1999 Moriya .................... C08F 6/001
                                                  526/224
6,448,354 B1 * 9/2002 Hieda ....................... C08F 2/02
                                                  526/319
(Continued)

FOREIGN PATENT DOCUMENTS

JP        5-148311 A    6/1993
JP        8-103937 A    4/1996
(Continued)

OTHER PUBLICATIONS

Extended European Search Report dated Feb. 2, 2018 in Patent Application No. 15829101.3, citing documents AA, AO and AP therein, 9 pages.

(Continued)

*Primary Examiner* — Michael M Bernshteyn
(74) *Attorney, Agent, or Firm* — Oblon, McClelland, Maier & Neustadt, L.L.P.

(57) ABSTRACT

A (meth)acrylic resin composition is obtained by a method comprising: continuously feeding a raw material solution essentially comprising methyl methacrylate, a chain transfer agent and a radical polymerization initiator, and optionally comprising an acrylic acid alkyl ester in a mass ratio of the acrylic acid alkyl ester to the methyl methacrylate of 0/100 to 20/80 into a tank reactor to allow bulk polymerization to proceed in the tank reactor at a polymerization conversion ratio of 40 to 70% by mass to obtain a reaction product while continuously discharging the reaction product from the tank reactor; heating the discharged reaction product with a heat exchanger; removing volatile matter from the heated reaction product; filtrating a liquid additive through a filter; and adding the filtrated liquid additive to the reaction product from which the volatile matter has been removed.

26 Claims, 1 Drawing Sheet

(58) Field of Classification Search
USPC .......................................................... 524/318
See application file for complete search history.

(56) References Cited

U.S. PATENT DOCUMENTS

| | | | | |
|---|---|---|---|---|
| 9,522,969 | B2* | 12/2016 | Yamamori | ............ C08F 220/14 |
| 9,914,796 | B2* | 3/2018 | Ozawa | ................. C08F 220/18 |
| 2015/0158963 | A1* | 6/2015 | Ozawa | ..................... C08F 2/01 |
| | | | | 526/224 |
| 2015/0191562 | A1* | 7/2015 | Ozawa | ..................... C08F 2/01 |
| | | | | 428/220 |
| 2016/0185884 | A1* | 6/2016 | Yamamori | ............ C08F 220/14 |
| | | | | 526/65 |

FOREIGN PATENT DOCUMENTS

| | | | |
|---|---|---|---|
| JP | 8-302145 A | | 11/1996 |
| JP | 2000-159818 A | | 6/2000 |
| JP | 2000159818 A | * | 6/2000 |
| JP | 2002-201228 A | | 7/2002 |
| JP | 2005-112869 A | | 4/2005 |
| JP | 2005112869 A | * | 4/2005 |
| WO | 2014/002504 A1 | | 1/2014 |
| WO | WO 2014/002503 A1 | | 1/2014 |
| WO | 2014/136699 A1 | | 9/2014 |
| WO | 2015/064576 A1 | | 5/2015 |

OTHER PUBLICATIONS

International Search Report dated Oct. 20, 2015 in PCT/JP2015/072399 filed Aug. 6, 2015.

* cited by examiner

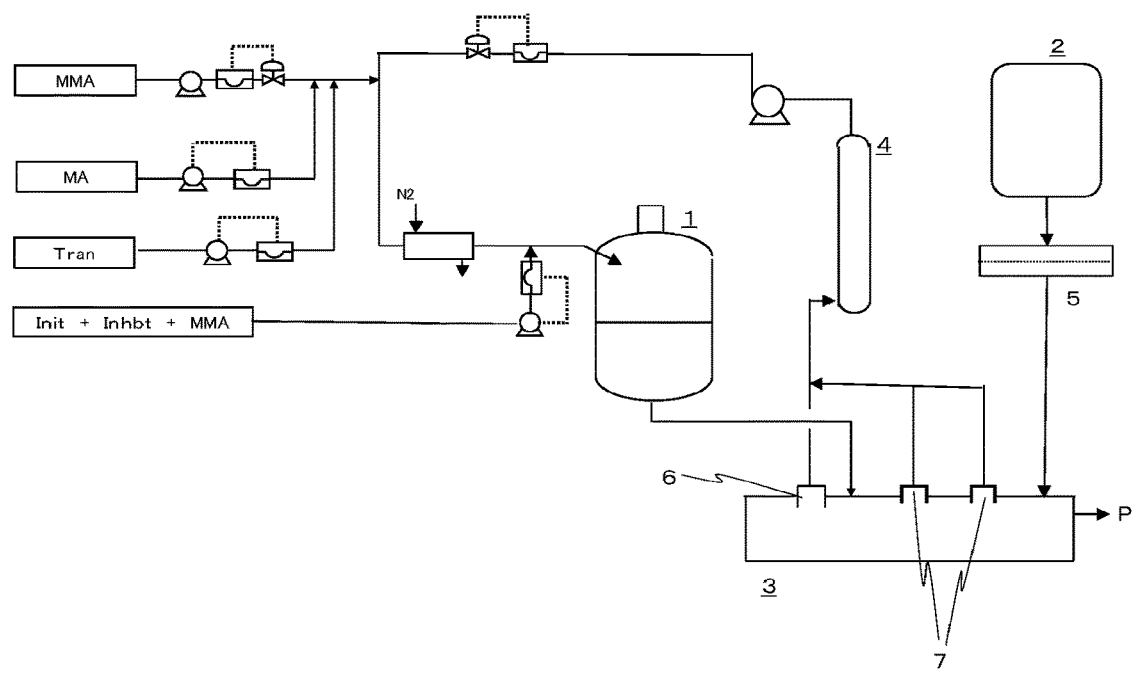

METHOD FOR PRODUCING (METH)ACRYLIC RESIN COMPOSITION

TECHNICAL FIELD

The present invention relates to a production method of a (meth)acrylic resin composition. More specifically, the present invention relates to a production method of a (meth)acrylic resin composition that contains few foreign substances, has excellent formability, and can be formed into a formed article having excellent optical properties.

BACKGROUND ART

Articles formed of a (meth)acrylic resin composition have excellent transparency and low optical distortion and therefore find applications as optical lenses, disc substrates, automobile parts, advertising displays, nameplates, lighting covers, light guide plates, and the like.

As one of methods for manufacturing a (meth)acrylic resin composition, known is a continuous bulk polymerization process, specifically the process comprising continuously feeding a raw material solution comprising a polymerizable monomer, a polymerization initiator and the like into a tank reactor for bulk polymerization while continuously discharging the resulting reaction product. The continuous bulk polymerization process is suitable for mass production of a (meth)acrylic resin composition having excellent optical properties.

Patent Document 1 discloses a method for producing a (meth)acrylic polymer, the method comprising steps of continuously feeding a raw material composition comprising a (meth)acrylic monomer, a radical polymerization initiator and a chain transfer agent into a polymerization tank, polymerizing at least a part of the (meth)acrylic monomer in the polymerization tank to obtain a reaction mixture containing a (meth)acrylic polymer resulting from polymerization of the at least a part of the (meth)acrylic monomer, continuously discharging the reaction mixture from the polymerization tank, introducing the reaction mixture thus discharged from the polymerization tank into an extruder unit equipped with vents so as to remove volatile matter, and adding an additive through an additive inlet positioned downstream of an outlet vent of the extruder unit equipped with vents.

CITATION LIST

Patent Literatures

Patent Document 1: JP 2005-112869 A

Non-Patent Literatures

Non-Patent Document 1: Technical data from Nippon Oil & Fats Co., Ltd. "Hydrogen abstraction capacity and efficiency as initiator of organic peroxides" (prepared on April, 2003)
Non-Patent Document 2: Kagaku Kogaku Binran edited by Kagaku Kogaku Kyokai, 3rd revision, p 1068 (1968)

SUMMARY OF THE INVENTION

Problems to be Solved by the Invention

In the method described in the patent document, since the addition of the additive to the reaction mixture is conducted after the volatile matter has been removed, the added additive will not be removed as volatile matter, allowing accurate control over the amount of the additive. When the additive contains moisture or other impurities, however, defects such as silver streaks may occur during injection molding.

An object of the present invention is to provide a method for producing a (meth)acrylic resin composition that contains few foreign substances, has excellent formability, and can be formed into an article or the like having excellent optical properties.

Means for Solving the Problems

Studies have been conducted to achieve the object. As a result, the present invention has been completed encompassing the following aspects.

[1] A method for producing a (meth)acrylic resin composition, the method comprising:
continuously feeding a raw material solution into a tank reactor, the raw material solution essentially comprising methyl methacrylate, a chain transfer agent and a radical polymerization initiator, optionally comprising an acrylic acid alkyl ester in a mass ratio of the acrylic acid alkyl ester to the methyl methacrylate of 0/100 to 20/80;
bulk polymerizing in the tank reactor at a polymerization conversion ratio of 40 to 70% by mass to obtain a reaction product;
continuously discharging the reaction product from the tank reactor;
heating the discharged reaction product with a heat exchanger;
removing volatile matter from the heated reaction product;
filtrating a liquid additive through a filter; and adding the filtrated liquid additive to the reaction product from which the volatile matter has been removed.

[2] The method for producing a (meth)acrylic resin composition according to the aspect [1], the method further comprising:
purging an additive preparation tank with an inert gas; and subsequently melting at least one additive in the additive preparation tank to obtain the liquid additive.

[3] The method for producing a (meth)acrylic resin composition according to the aspect [1] or [2], the method further comprising:
storing the liquid additive at not more than 130° C.

[4] The method for producing a (meth)acrylic resin composition according to any one of the aspects [1] to [3], wherein both of the removing the volatile matter from the reaction product and the adding the filtrated liquid additive to the reaction product are conducted in a vented extruder.

[5] The method for producing a (meth)acrylic resin composition according to the aspect [4], wherein the adding the filtrated liquid additive to the reaction product within the vented extruder is conducted at a position that is closer to a polymer outlet than a front vent closest to the polymer outlet.

[6] The method for producing a (meth)acrylic resin composition according to any one of the aspects [1] to [5], wherein the raw material solution is prepared by mixing a raw material solution (A) essentially comprising the methyl methacrylate and the chain transfer agent and optionally comprising the acrylic acid alkyl ester with a raw material solution (B) comprising the radical polymerization initiator and methyl methacrylate.

Advantageous Effects of the Invention

According to the production method of the present invention, a (meth)acrylic resin composition containing few foreign substances and having excellent formability can be obtained. The (meth)acrylic resin composition obtained by the production method of the present invention can provide a formed article having excellent optical properties.

BRIEF DESCRIPTION OF THE DRAWINGS

FIG. 1 an illustration of an example of an apparatus used for implementing the production method of the present invention.

EMBODIMENTS FOR CARRYING OUT THE INVENTION

A method for producing a (meth)acrylic resin composition according to an embodiment of the present invention comprises: continuously feeding a raw material solution into a tank reactor, bulk polymerizing in the tank reactor to obtain a reaction product, continuously discharging the reaction product from the tank reactor; heating the discharged reaction product with a heat exchanger; removing volatile matter from the heated reaction product; filtrating a liquid additive through a filter; and adding the filtrated liquid additive to the reaction product from which the volatile matter has been removed. In the present invention, it is preferable to concurrently perform the feeding the raw material solution into the reactor, the bulk polymerizing, the discharging the reaction product from the reactor, the heating with the heat exchanger, the removing the volatile matter, the filtrating, and the adding the liquid additive.

The raw material solution used in the present invention essentially comprises methyl methacrylate, a chain transfer agent and a radical polymerization initiator and optionally comprises an acrylic acid alkyl ester.

As the chain transfer agent comprised in the raw material solution, mentioned can be an alkyl mercaptan such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate and the like; α-methylstyrene dimer; terpinolene; and the like. Among these, a monofunctional alkylmercaptan such as n-octyl mercaptan, n-dodecyl mercaptan and the like are preferable. The chain transfer agent can be used alone or in combination of 2 or more. The amount of the chain transfer agent to be added is preferably 0.1 to 1 part by mass, more preferably 0.2 to 0.8 part by mass, further preferably 0.3 to 0.6 part by mass, relative to 100 parts by mass of the total amount of the polymerizable monomers subjected to the polymerization.

The radical polymerization initiator comprised in the raw material solution is not particularly limited as long as it generates reactive radicals. However, the radical polymerization initiator has a half-life at a temperature inside the tank reactor, which is to be described below, of preferably 0.5 to 120 seconds, more preferably 2 to 60 seconds. The polymerization initiator has a hydrogen abstraction capacity of preferably not more than 40%, more preferably not more than 30%. The polymerization initiator can be used alone or in combination of 2 or more.

Examples of the radical polymerization initiator can include t-hexylperoxy isopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy)cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate), and the like. Among these, 2,2'-azobis(2-methylpropionitrile), t-hexylperoxy 2-ethylhexanoate, 1,1-bis(t-hexylperoxy)cyclohexane, and dimethyl 2,2'-azobis(2-methylpropionate) are preferable.

The hydrogen abstraction capacity can be found, for example, in the Technical data from the manufacturer of the polymerization initiator (for example, Non-patent Document 1), or can be determined by the radical trapping method using an α-methylstyrene dimer, in other words, by the α-methylstyrene dimer trapping method. The determination is typically carried out as follows. First, in the co-presence of an α-methylstyrene dimer serving as a radical-trapping agent, the polymerization initiator is cleaved into radical fragments. Among the resulting radical fragments, a radical fragment having a low hydrogen abstraction capacity adds to and is trapped by a double bond of an α-methylstyrene dimer, while a radical fragment having a high hydrogen abstraction capacity abstracts hydrogen from cyclohexane to generate a cyclohexyl radical, which adds to and is trapped by a double bond of an α-methylstyrene dimer to generate a cyclohexane-trapped product. Then, the cyclohexane or the cyclohexane-trapped product is quantitatively assessed, and the resulting value is used to determine the ratio (molar fraction) of the amount of the radical fragments having high hydrogen abstraction capacities to the theoretical amount of radical fragments generated. The resulting ratio serves as the hydrogen abstraction capacity.

Examples of the acrylic acid alkyl ester can include methyl acrylate, ethyl acrylate, propyl acrylate, butyl acrylate, 2-ethylhexyl acrylate, and the like. The acrylic acid alkyl ester can be used alone or in combination of 2 or more. Among these, methyl acrylate is preferable.

In the raw material solution, the mass ratio of the acrylic acid alkyl ester to the methyl methacrylate is 0/100 to 20/80, preferably 0/100 to 10/90.

In the raw material solution, an additional polymerizable monomer can be comprised. Examples of the polymerizable monomer can include vinyl monomers having a single polymerizable alkenyl group per molecule, for example, methacrylic acid alkyl esters except for methyl methacrylate, such as ethyl methacrylate, propyl methacrylate, butyl methacrylate, 2-ethylhexyl methacrylate and the like; methacrylic acid aryl esters such as phenyl methacrylate and the like; methacrylic acid cycloalkyl esters such as cyclohexyl methacrylate, norbornenyl methacrylate and the like; acrylic acid aryl esters such as phenyl acrylate and the like; acrylic acid cycloalkyl esters such as cyclohexyl acrylate, norbornenyl acrylate and the like; aromatic vinyl monomers such as styrene, α-methylstyrene and the like; acrylamide; methacrylamide; acrylonitrile; methacrylonitrile; and the like. An amount of the additional polymerizable monomer is preferably not more than 10 parts by mass, more preferably not more than 5 parts by mass, relative to 100 parts by mass of the total amount of the polymerizable monomers subjected to the polymerization.

The method for preparing the raw material solution is not particularly limited. Preferably, the raw material solution is prepared by mixing a raw material solution (A) with a raw material solution (B). The method for mixing the raw material solution (A) with the raw material solution (B) is not particularly limited. From the viewpoint of smoothly conducting continuous polymerization reaction described below, the mixing of the raw material solution (A) and the raw material solution (B) is preferably conducted in an apparatus or the like, which is capable of in-line continuous mixing, such as a static mixer, a dynamic mixer and the like.

The raw material solution (A) essentially comprises methyl methacrylate and the chain transfer agent and optionally comprises the acrylic acid alkyl ester. In the raw material solution (A), an additional polymerizable monomer can be comprised.

The mass ratio between methyl methacrylate and the acrylic acid alkyl ester in the raw material solution (A) is not particularly limited provided that the mixture of the raw material solution (A) and the raw material solution (B) has a mass ratio of the acrylic acid alkyl ester to methyl methacrylate preferably of 0/100 to 20/80, more preferably 0/100 to 10/90.

The sum of the amount of methyl methacrylate essentially comprised in the raw material solution (A) and the amount of the acrylic acid alkyl ester optionally comprised in the raw material solution (A) is an amount that the amount of the additional polymerizable monomer optionally comprised in the raw material solution (A) and the amount of methyl methacrylate comprised in the raw material solution (B) described below are subtracted from 100 parts by mass of the total amount of the polymerizable monomers subjected to the polymerization, The methyl methacrylate, the acrylic acid alkyl ester and the additional polymerizable monomer used in the present invention preferably contain a polymerization inhibitor for preventing polymerization reaction during storage in the presence of oxygen. The polymerization inhibitor is not particularly limited as long as it is capable of inhibiting polymerization reaction in the presence of oxygen, but preferably, the polymerization inhibitor does not inhibit polymerization reaction in an inert gas atmosphere. Typical examples of the polymerization inhibitor can include phenol-based polymerization inhibitors such as butylxylenol, p-methoxyphenol, hydroquinone and the like; phenothiazine; and the like. The amount of the polymerization inhibitor is preferably 0.1 ppm to 50 ppm, more preferably 0.5 ppm to 30 ppm, relative to the total amount of polymerizable monomers comprised in the raw material solution (A).

The concentration of dissolved oxygen in the raw material solution (A) is preferably not more than 50 ppm, more preferably not more than 1 ppm. When the concentration of dissolved oxygen in the raw material solution (A) is high, polymerization may not proceed steadily.

The raw material solution (A) has a b* value of preferably −1 to +2, and more preferably −0.5 to +1.5. The b* value within this range is advantageous because the resulting (meth)acrylic resin composition efficiently gives a formed article having little discoloration. The b* value is a value as measured in accordance with the standard defined by Commission internationale de l'Eclairage (1976) or JIS Z-8722.

The methyl methacrylate, the acrylic acid alkyl ester or the chain transfer agent may be a mixture of a virgin material (not yet undergone polymerization reaction) fed from a raw-material tank and unreacted matter that has been fed for use in polymerization reaction and recovered as described below. The unreacted matter thus recovered may contain a dimer or a trimer in addition to methyl methacrylate, the acrylic acid alkyl ester, and the chain transfer agent, and may have a high b* value due to heat applied during recovery or the like. In this case, the dimer and the trimer can be removed by purification by a known method to give a b* value preferably of −1 to +2, more preferably of −0.5 to +1.5. The b* value within this range is advantageous because the resulting (meth)acrylic resin composition efficiently gives a formed article having little discoloration.

The method for preparing the raw material solution (A) is not particularly limited. For example, the raw material solution (A) can be obtained by mixing methyl methacrylate, the acrylic acid alkyl ester and the chain transfer agent at a predetermined proportion and then bringing the resulting mixture into contact with an inert gas such as nitrogen gas for removal of dissolved oxygen.

When bringing the raw material solution (A) into contact with the inert gas, the ratio of the amount of the raw material solution (A) being fed (kg/h) to the amount of the inert gas being fed ($Nm^3/h$) is preferably less than 0.30. With this ratio, the concentration of dissolved oxygen in the raw material solution (A) can be efficiently reduced. For higher efficiency in terms of contact with the inert gas, bubbling of the inert gas in the raw material solution (A) can be performed, for instance.

The raw material solution (B) comprises the radical polymerization initiator and methyl methacrylate.

The amount of the radical polymerization initiator to be fed is considerably smaller than the amount of the raw material solution (A) being fed. Therefore, for smooth feeding of the radical polymerization initiator, the radical polymerization initiator is preferably dissolved in and diluted with methyl methacrylate, for use as the raw material solution (B).

The concentration of the radical polymerization initiator in the raw material solution (B) is preferably not less than 0.01% by mass and less than 4% by mass, more preferably not less than 0.1% by mass and less than 2% by mass. When the concentration of the radical polymerization initiator is extremely low, the amount of the raw material solution (B) required to be fed into a reaction tank is high, leading to potentially unsteady polymerization. When the concentration of the radical polymerization initiator is extremely high, storage stability of the raw material solution (B) is low, and as a result, inconveniences are likely to occur when operation resumes after a prolonged halt.

In the raw material solution (B), a polymerization inhibitor is preferably comprised for the purpose of inhibiting undesirable polymerization of methyl methacrylate. The polymerization inhibitor contained in the raw material solution (B) is not particularly limited provided that it exhibits an effect of inhibiting polymerization reaction in the presence of oxygen, but preferably, the polymerization inhibitor does not inhibit polymerization reaction in an inert gas atmosphere. Typical examples of the polymerization inhibitor can include phenol-based polymerization inhibitors such as butylxylenol, p-methoxyphenol, hydroquinone and the like; phenothiazine; and the like. The amount of the polymerization inhibitor is preferably 0.1 ppm to 50 ppm, more preferably 0.5 ppm to 30 ppm, relative to the amount of methyl methacrylate contained in the raw material solution (B).

The temperature of the raw material solution (B) in the presence of oxygen is preferably maintained at not more than 0° C. Oxygen can be made present by, for example, blowing air into a tank in which the raw material solution (B) is being prepared. When the temperature of the raw material solution (B) is maintained at not more than 0° C., alteration in the quality of the raw material solution (B) is inhibited. When the temperature of the raw material solution (B) is more than 0° C., the radical polymerization initiator may be decomposed and lead to radical generation, resulting in facilitated polymerization reaction of methyl methacrylate as solvent.

Basically, no solvent is used in bulk polymerization. However, when it is necessary to regulate viscosity, for instance, a solvent can be contained in the raw material solution (A) or the raw material solution (B). As the solvent, an aromatic hydrocarbon such as benzene, toluene, ethylbenzene or the like is preferable. The solvents can be used alone or in combination of two or more. The amount of the solvent to be used is preferably not more than 30 parts by mass, more preferably not more than 10 parts by mass, relative to 100 parts by mass of the total amount of polymerizable monomers subjected to the polymerization.

The tank reactor used in the method of the present invention usually has a reaction tank, a stirring means for agitating liquid in the reaction tank, an inlet through which the raw material solution is fed into the reaction tank, and an outlet through which the reaction product is discharged from the reaction tank. In the tank reactor used in the present invention, the inlet through which the raw material solution is fed into the reaction tank may be provided in a top surface of the reaction tank, or may be provided in a side surface of the reaction tank, or may be provided in a bottom surface of the reaction tank. The inlet may be provided at a position higher than the liquid level in the reaction tank or may be provided at a position lower than the liquid level in the reaction tank. The shape of an opening at the end of the inlet may be simply an actual cut end of a round tube, or may be shaped so that the raw material solution is widely sprinkled onto the liquid surface in the reaction tank.

The method for feeding the raw material solution into the tank reactor is not particularly limited. For example, feeding may be performed into a tank reactor that is equipped with at least two inlets, with the raw material solution (A) and the raw material solution (B) being fed separately through a different inlet, or feeding may be performed into a tank reactor that is equipped with at least one inlet, with the flow of the raw material solution (A) and the flow of the raw material solution (B) joining within a pipe or a mixing tank immediately upstream of the inlet, before being fed through the inlet into the tank reactor. A dynamic stirrer or a static stirrer can be provided where they join.

The raw material solution (A) and the raw material solution (B) are fed into the tank reactor preferably at a mass ratio of the raw material solution (A) to the raw material solution (B) of 10/1 to 1000/1. When the amount of the raw material solution (A) being fed is extremely high, the concentration of the radical polymerization initiator in the raw material solution (B) needs to be high so that polymerization reaction can be initiated. As a result, storage stability of the raw material solution (B) tends to be impaired. When the amount of the raw material solution (A) being fed is extremely low, the concentration of dissolved oxygen within the tank in which polymerization reaction proceeds is high, leading to potentially unsteady polymerization.

In the present invention, the total amount of the raw material solution being fed into the reaction tank and the total amount of the reaction product being discharged from the reaction tank are kept in balance so that the amount of liquid in the reaction tank remains approximately constant. The amount of liquid contained in the reaction tank is preferably not less than ¼, more preferably ¼ to ¾, further preferably ⅓ to ⅔ the capacity of the reaction tank. In the present invention, bulk polymerization reaction is preferably carried out in an inert gas atmosphere that is produced by a method such as introducing an inert gas into the gas phase in the reaction tank.

Examples of the stirring means for agitating liquid contained in the reaction tank can include a Maxblend stirring device, a lattice-blade-type stirring device, a propeller-driven stirring device, a screw stirring device, a helical-ribbon-type stirring device, a paddle-type stirring device, and the like. Among these, a Maxblend stirring device is preferable in terms of homogeneous mixing.

The temperature inside the tank reactor, namely, the temperature of liquid contained in the reaction tank is preferably 100° C. to 170° C., more preferably 110° C. to 160° C., further preferably 115° C. to 150° C. The temperature of the liquid can be controlled by a method such as external heat exchange using a jacket, a heat exchanger tube, or the like, or self heat exchange in which a tube is provided within the reaction tank so that the raw material solutions or the reaction product flows through the tube.

Bulk polymerization within the tank reactor is allowed to proceed until the polymerization conversion ratio reaches 40 to 70% by mass, preferably 42 to 65% by mass.

In the method for producing a (meth)acrylic resin composition of the present invention, the water content of the reaction solution in the tank reactor is preferably not more than 1000 ppm, more preferably not more than 700 ppm, further preferably not more than 280 ppm. When the water content is not more than 1000 ppm, a foreign resin substance of several micrometers to several dozen micrometers can be inhibited from generating during polymerization reaction, and consequently, when the resulting (meth)acrylic resin composition is subjected to melt forming, the resulting film or sheet can have a significantly reduced number of blemishes attributable to the foreign resin substance that serves as a nucleus and has an outer diameter of several dozen micrometers.

Although the mechanism that the generating of the foreign resin substance is thus inhibited is unclear, it is presumed that a (meth)acrylic resin having a high molecular weight may be formed in the gas phase within the reaction tank, be mixed as a foreign resin substance, remain unmelted during melt forming, and act as a nucleus to form a blemish.

Examples of the method for reducing the water content of the reaction product solution can include a method in which the raw material solution is treated with an adsorption/dehydration column or the like before being fed into the tank reactor; a method in which an inert gas is introduced into the gas phase within the tank reactor so that part of the vapor is entrained in the inert gas, condensed in a condenser of a brine cooler, and discharged out of the system; and the like.

Downstream of the tank reactor, additional reactor may be provided. The additional reactor that may be provided downstream may be a tank reactor or a tube reactor. The additional reactor can allow bulk polymerization to further proceed and can give an even higher polymerization conversion ratio.

The reaction product obtained by the bulk polymerization as above is discharged from the tank reactor (or from the additional reactor provided downstream, if any). The amount of the reaction product being discharged is preferably balanced with the amount of the raw material solutions being fed so that the amount of liquid contained in the reaction tank remains constant.

The reaction product contains the (meth)acrylic resin and may also contain an unreacted polymerizable monomer (methyl methacrylate or acrylic acid alkyl ester, for example) and/or an unreacted chain transfer agent.

The content of the (meth)acrylic resin in the reaction product is preferably 40% by mass to 70% by mass, more preferably 42% by mass to 65% by mass. When the content of the (meth)acrylic resin is extremely high, viscosity rises and stirring force required tends to be great. When the content of the (meth)acrylic resin is extremely low, removal of the unreacted matter in the step of removing the unreacted matter from the reaction product proceeds insufficiently, and the resulting (meth)acrylic resin composition tends to give a formed article having defective appearance such as silver streaks or the like.

The (meth)acrylic resin has a weight average molecular weight (hereinafter, sometimes abbreviated as Mw) of preferably 35 thousand to 200 thousand, more preferably 40 thousand to 150 thousand, and further preferably 45 thousand to 130 thousand. When the Mw is extremely low, a formed article of the (meth)acrylic resin composition tends to have poor impact resistance and poor toughness. When the Mw is extremely high, the fluidity of the (meth)acrylic resin composition tends to be low and forming processability tends to be low.

The (meth)acrylic resin has a ratio of the weight average molecular weight to a number average molecular weight (hereinafter, this ratio is sometimes expressed as molecular weight distribution) of preferably 1.5 to 2.6, more preferably 1.6 to 2.3, particularly preferably 1.7 to 2.0. When the molecular weight distribution is low, forming processability of the (meth)acrylic resin composition tends to be poor. When the molecular weight distribution is high, a formed article of the (meth)acrylic resin composition tends to have poor impact resistance and be brittle.

The weight average molecular weight and the number average molecular weight are the molecular weights in terms of standard polystyrene determined by GPC (gel permeation chromatography). The weight average molecular weight and the molecular weight distribution of the (meth)acrylic resin can be controlled by selecting, for example, the types and the amounts of the polymerization initiator and the chain transfer agent.

The volatile matter, such as the unreacted matter or the like, contained in the reaction product can be recovered by a known chemical engineering means. Preferable examples of the recovery method can include a heat devolatization method, and the like. Examples of the heat devolatization method can include the equilibrium flash evaporation method, the adiabatic flash evaporation method, and the like. And the adiabatic flash evaporation method is preferable.

In the present invention, a first step is to heat the discharged reaction product with a heat exchanger. As a heat source for the heat exchanger, steam generated with a boiler or another device can be used. Alternatively, vapor of the volatile matter, to be described below, evaporated from the reaction product can be used as the heat source. For enhancing efficiency in flash evaporation, the reaction product can be applied pressure with a pump or the like.

As a next step, the heated reaction product can be introduced into a tank or the like the pressure inside which is reduced. Thus, flash evaporation can be conducted. The adiabatic flash evaporation method is carried out at a temperature of preferably 200° C. to 300° C., more preferably 220° C. to 270° C. When the adiabatic flash evaporation method is carried out at a temperature less than 200° C., removal of volatile matter takes long time, removal of volatile matter may proceed insufficiently, and a formed article may have defective appearance such as silver streaks or the like. On the other hand, when the adiabatic flash evaporation method is carried out at a temperature more than 300° C., oxidation, burning, or the like tend to occur and discoloration of the (meth)acrylic resin composition tends to occur. The adiabatic flash evaporation method may be carried out in multiple stages. Vapor of the unreacted matter generated by flash evaporation can be used for heating the reaction product flowing through the heat exchanger tube, followed by feeding the heated reaction product into a flash tank at low pressure to cause flash evaporation.

Removal of volatile matter can be conducted by a vented extruder. A typical vented extruder has a reaction product inlet through which a reaction product containing a polymer and volatile matter can be fed, a polymer outlet through which a polymer separated from the reaction product can be discharged, at least one vent through which volatile matter separated from the reaction product can be discharged, and a screw for transferring the reaction product from the reaction product inlet to the polymer outlet while kneading. Vent closer to the polymer outlet than the reaction product inlet is called a front vent, and vent farther from the polymer outlet than the reaction product inlet is called a rear vent. In the vented extruder used in the present invention, an additive inlet is provided at a position that is closer to the polymer outlet than the front vent closest to the polymer outlet. It is preferable that the interior of the extruder is under reduced pressure for subjecting the reaction product fed into the extruder to flash evaporation at the reaction product inlet. As the reaction product is transferred by the screw, volatile matter evaporates. The evaporated volatile matter is discharged through the vents. The extruder may be a single screw extruder or a twin screw extruder, for example. A typical screw has different zones, namely, a feed zone, a compression zone, a metering zone, and a mixing zone, but the screw used in the present invention is not particularly limited thereto. In the mixing zone, an appropriate combination of screws of various shapes having projections and depressions, grooves, and pins, such as a Dulmage-type screw, a rotor-type screw, a flute-mixing-type screw and the like, can be used.

The volatile matter immediately after recovered by the above removing method of volatile matter may contain a dimer or a trimer in addition to methyl methacrylate, the acrylic acid alkyl ester, and the chain transfer agent. The dimer or the trimer may affect the properties of the (meth) acrylic resin and is therefore preferably removed from the volatile matter. Upon removal of the dimer or the trimer, part of the chain transfer agent and solvent may also be removed.

Removal of the dimer or the trimer can be conducted by a known chemical engineering means. Preferable examples thereof can include distillation and the like. A distillation column used in the present invention is not particularly limited but is preferably a multi-stage distillation column having approximately 6 to 20 stages and having a reflux ratio of approximately 0.4 to 2.0. The amount of volatile matter remaining in the (meth)acrylic resin composition obtained in the present invention is preferably not more than 1% by mass, more preferably not more than 0.5% by mass.

To the reaction product from which the volatile matter has been removed, the liquid additive is added. The liquid additive has been filtrated through a filter. The filter used is not particularly limited provided that it can remove foreign substances from the liquid additive. Examples of the filter include resin filters, metal filters, and the like. Examples of the metal filters can include sintered filters, multi-layer filters, and the like. The filter preferably has an operating temperature limit of not less than 140° C. The filter preferably has a aperture size of not more than 1 μm.

The method for adding the filter-filtrated liquid additive to the reaction product from which the volatile matter has been removed is not particularly limited. However, addition of the filter-filtrated liquid additive into the vented extruder is preferably conducted through the additive inlet provided at a position closer to the polymer outlet than the front vent closest to the polymer outlet. The liquid additive can be fed with a metering pump or the like. Preferably, the area near the additive inlet is located in the mixing zone of the screw.

As the liquid additive, an additive that is solid at normal temperature is used in a melted state or an additive that is liquid at normal temperature is used as it is. Use of a solution of an additive is tolerable but should be avoided because solvent is to remain in the resin composition to serve as an impurity. An additive with a high melting point can be made into a melted state at a low temperature when mixed with another additive. The additive used in the present invention is not particularly limited provided that it is commonly used in methacrylic resin production and that it is liquid or can be made into liquid. Examples of the additive can include a lubricant (a higher alcohol or a glycerin monoester, for example), a processing aid, a light stabilizer, an antioxidant, a plasticizer, an ultraviolet absorber, an anti-impact agent, a foaming agent, a filler, a colorant, an antistatic agent, a light dispersing agent, and the like.

When an additive that is solid at normal temperature is stored in a melted state, the additive may undergo discoloration or decomposition, for example. Therefore, a preparation tank for preparing an additive that is solid at normal temperature is preferably made free from water and oxygen, for example, prior to use. Examples of the method therefor can include purge with an inert gas such as nitrogen, and the like. The conditions of the inert gas, such as the pressure, the flow rate, the purge duration or the like, can be appropriately selected. For example, the pressure of the inert gas is preferably not less than 0.1 MPa, and the flow rate of the inert gas is preferably not less than 0.1 V/min with V being the capacity of the additive preparation tank. The duration of inert gas purge depends on other conditions, but it is preferably not less than 1 minute.

The additive preparation tank is not particularly limited provided that it withstands heat upon melting and withstands corrosion attributed to the additive. The additive preparation tank is preferably a hermetically closable tank the pressure inside which can be increased or decreased. The additive preparation tank is preferably equipped with a stirring means. Melting the additive is conducted by heating the additive. The temperature during storage of the liquid additive is preferably not more than 130° C., more preferably not more than 125° C., for preventing the liquid additive from quality variation or decomposition, for example.

The extruder can be equipped with a breaker plate, a screen or the like at the polymer outlet so as to remove foreign substances, carbonized matter, gel-like matter or the like. The breaker plate is typically a circular plate having a number of pores with diameters of 3 mm to 4 mm arranged in a concentric pattern. The screen is one metal mesh or several metal meshes stacked together that have various aperture designs selected in accordance with the application and the purpose.

For ease of handling as a forming material, the (meth) acrylic resin composition obtained by the method of the present invention may be made into a form such as pellets, powders, granules or the like by a known method.

By subjecting the (meth)acrylic resin composition obtained by the method of the present invention to forming (through heating and melting) by a conventionally-known forming method such as injection molding, compression molding, extrusion, vacuum forming or the like, various formed articles can be obtained. Examples of the formed articles composed of the (meth)acrylic resin composition can include parts of signboards such as advertising pillars, sign stands, projecting signboards, door-top signs, roof-top signs or the like; display parts such as showcases, dividers, store display parts or the like; lighting parts such as fluorescent lamp covers, mood lighting covers, lampshades, and parts of luminous ceilings, luminous walls, chandeliers or the like; parts of interiors such as pendants, mirrors or the like; building parts such as doors, domes, safety window panes, partitions, stair skirting boards, balcony skirting boards, roofs of buildings for recreational use; transportation-related parts such as aircraft windshields, pilot visors, motorcycle windshields, motorboat windshields, visors for buses, side visors for automobiles, rear visors, head wings, headlight covers or the like; electronics parts such as nameplates for audiovisuals, stereo covers, television protection masks, parts of vending machines or the like; parts of medical equipment such as incubators, X-ray machine parts or the like; parts related to instruments, such as machinery covers, gauge covers, parts of experiment instruments, rulers, dials, view windows or the like; optics-related parts such as protective plates for liquid crystal, light guide plates, light guide films, Fresnel lenses, lenticular lenses, front plates of various displays, light dispersing plates or the like; traffic-related parts such as traffic signs, direction boards, traffic mirrors, noise barrier walls or the like; film members such as protective films for polarizers, protective films for polarizer plates, retardation films, surface materials for automotive interior, surface materials of mobile phones, marking films or the like; appliance parts such as lid materials and control panels of washers, top panels of rice cookers or the like; other items such as greenhouses, large water tanks, box-shaped water tanks, clock panels, bathtubs, sanitary wares, desk mats, gaming parts, toys, welding masks for facial protection; and the like.

The present invention is described more specifically by examples and comparative examples. The present invention is, however, not limited to these examples.

Example 1

To a raw material solution (A) comprising methyl methacrylate (MMA), methyl acrylate (MA) and n-octyl mercaptan (OM), a raw material solution (B) comprising azobisisobutyronitrile (AIBN) and MMA was added and mixed to obtain a raw material mixed solution comprising 98.9 parts by mass of MMA, 1.1 parts by mass of MA, 0.257 part by mass of OM, and 74 ppm of AIBN. The raw material mixed solution was continuously fed into a polymerization reaction tank at 140° C. to allow bulk polymerization to proceed in the polymerization reaction tank for an average residence time of 2 hours while the resulting reaction product was continuously discharged from the polymerization reaction tank. Feeding the raw material mixed solution, bulk polymerization, and discharging the reaction product were performed simultaneously. The polymerization conversion ratio was 52%.

The polymerization conversion ratio was determined as follows. To a gas chromatograph (GC-14A manufactured by Shimadzu Corporation), a column (GLC-G-230 manufactured by Sciences Inc.; INERT CAP 1 (df=0.4 μm, I.D.=0.25 mm, length=60 m)) was attached. As the reaction product being continuously discharged from the polymerization reaction tank, analysis was performed under conditions where the injection temperature was 180° C., the detector temperature was 180° C., and the column temperature was raised from 60° C. to reach 200° C. at a temperature raising rate of 10° C./min.

As being continuously discharged from the polymerization reaction tank, the reaction product was sequentially heated to 240° C. with a heat exchanger and fed to a reaction product inlet of a vented extruder. Near the reaction product inlet of the vented extruder, the reaction product underwent flash evaporation. The evaporated volatile matter was discharged through a rear vent. As the reaction product was sequentially transferred within the vented extruder by means of a screw, volatile matter as it evaporated was discharged through a front vent.

An additive preparation tank with a capacity of V [L] was purged with nitrogen (dew point, −70° C.) at a flow rate of 0.5 V [L/min] and a pressure of 0.25 [MPa] for 10 minutes. To the additive preparation tank, 0.150 part by mass of stearic acid monoglyceride and 0.020 part by mass of an ultraviolet absorber (JF-77 manufactured by Johoku Chemical Co., Ltd.) were added. The pressure inside the preparation tank was increased to 0.2 MPa and then decreased to atmospheric pressure, which was repeated 4 times. Thus, oxygen and water were removed from the preparation tank, in other words, the oxygen concentration was made to be 0%. The temperature inside the preparation tank was increased to 120° C., at which stirring was conducted for 2 hours for melting an additive to obtain a liquid additive having a temperature of 120° C. The resulting liquid additive was filtrated through a metal filter having an aperture size of 0.2 μm (FLHF200-10M3F manufactured by PALL). Then, the liquid additive was fed by a metering pump to an additive inlet of the vented extruder. The additive inlet was provided at a position closer to a polymer outlet than the front vent closest to the polymer outlet. The amount of the liquid additive being fed to the additive inlet was regulated in accordance with a polymerization conversion ratio so that the amount of the stearic acid monoglyceride was 0.150 part by mass and the amount of the ultraviolet absorber (JF-77 manufactured by Johoku Chemical Co., Ltd.) was 0.020 part by mass relative to 100 parts by mass of the polymer component.

The resin composition was extruded through the polymer outlet of the vented extruder and cut with a cutter to obtain a pellet-like resin composition.

<Additive Content>

The pellet-like resin composition extruded 6 hours after the start of the extrusion of the resin composition through the polymer outlet was sampled for use as a resin specimen.

The resin specimen was dissolved in dichloromethane to obtain a solution. To the resulting solution, hexane was added. The supernatant was picked and analyzed on a gas chromatograph (GC-17A manufactured by Shimadzu Corporation) using a column (GLC-G-230 manufactured by Sciences Inc.; INERT CAP 1 (df=1.0 μm, I.D.=1.2 mm, length=40 m)) under conditions where the injection temperature was 270° C., the detector temperature was 270° C., and the column temperature was raised from 70° C. to 270° C. at 10° C./min. Simultaneously, the supernatant was analyzed on a high-performance liquid chromatograph (LC-9A and CTO-20AC manufactured by Shimadzu Corporation; HITACHI detector L-7400) using a column (ODS manufactured by GL Sciences Inc.; INERT CAP 1 (particle diameter=5.0 μm, I.D.=4.6 mm, length=150 mm)) under conditions where the wavelength was 230 nm, the eluting solution was methanol, the flow rate was 2 ml/min, and the specimen injection volume was 5 μl.

<MFR>

The melt flow rate of the resin specimen was measured in accordance with JIS K7210 under conditions at 230° C. and 3.8-kg load for 10 minutes.

<Formability>

The resin specimen was subjected to injection molding by an injection molding machine (M-100-DM manufactured by Meiki Co., Ltd.) at a cylinder temperature of 300° C., a die temperature of 50° C., and a molding cycle of 15 minutes to obtain a flat plate having a length of 200 mm, a width of 60 mm, and a thickness of 0.6 mm. Ten pieces of the resulting flat plates were examined by the naked eye for air bubbles (silver streaks). Evaluation was conducted based on the following criteria.

AA; No silver streaks observed.

BB; Silver streaks observed, even to a slight extent.

<Number of Foreign Substances>

The resin specimen was subjected to injection molding by means of an injection molding machine (AN-50 manufactured by Niigata Engineering Co., Ltd.) at a cylinder temperature of 250° C., a die temperature of 50° C., and a molding cycle of 1 minute to obtain a flat plate having a length of 80 mm, a width of 50 mm, and a thickness of 3 mm. The resulting flat plate was examined by the naked eye for counting the number of foreign substances.

These results are shown in Table 1.

Example 2

A pellet-like resin composition was obtained in the same manner as in Example 1 except that the amounts of MMA, MA, OM, and AIBN were changed according to Table 1 and 0.150 part by mass of stearic acid monoglyceride and 0.020 part by mass of the ultraviolet absorber (JF-77 manufactured by Johoku Chemical Co., Ltd.) were replaced with 0.075 part by mass of stearic acid alcohol, 0.025 part by mass of stearic acid monoglyceride and 0.010 part by mass of an antioxidant (HP-10 manufactured by ADEKA Corporation), and the polymerization conversion ratio was 60%. Physical properties of the resin composition were measured in the same manner as in Example 1. The results are shown in Table 1.

Example 3

A pellet-like resin composition was obtained in the same manner as in Example 2 except that the temperature during storage of the liquid additive was changed from 120° C. to 140° C., and the polymerization conversion ratio was 60%. Physical properties of the resin composition were measured in the same manner as in Example 1. The results are shown in Table 1.

Example 4

A pellet-like resin composition was obtained in the same manner as in Example 2 except that nitrogen purge of the additive preparation tank was not conducted, and the polymerization conversion ratio was 60%. Physical properties of the resin composition were measured in the same manner as in Example 1. The results are shown in Table 1.

Example 5

A pellet-like resin composition was obtained in the same manner as in Example 2 except that 0.075 part by mass of stearic acid alcohol, 0.025 part by mass of stearic acid monoglyceride and 0.010 part by mass of the antioxidant (HP-10 manufactured by ADEKA Corporation) were replaced with 0.225 part by mass of stearic acid alcohol, 0.075 part by mass of stearic acid monoglyceride and 0.050 part by mass of paraffin, and the polymerization conversion ratio was 60%. Physical properties of the resin composition were measured in the same manner as in Example 1. The results are shown in Table 1.

Comparative Example 1

A pellet-like resin composition was obtained in the same manner as in Example 1 except that a mixed powder of 0.150 part by mass of stearic acid monoglyceride and 0.020 part by mass of the ultraviolet absorber (JF-77 manufactured by Johoku Chemical Co., Ltd.), instead of the liquid additive, was fed to the additive inlet by means of a constant feeder and a sub-extruder. The polymerization conversion ratio was 52%. Physical properties of the resin composition were measured in the same manner as in Example 1. The results are shown in Table 1.

position of the antioxidant during stirring and melting. Therefore, it has been proven that Example 2 exhibits superior formability.

EXPLANATION OF SYMBOLS

1: tank reactor
2: liquid additive preparation tank
3: vented extruder
4: distillation column
5: filter
6: rear vent
7: front vent
MMA: methyl methacrylate
MA: methyl acrylate
Tran: chain transfer agent
Init: polymerization initiator

TABLE 1

|  |  | Example | | | | | Comp. Ex. |
|---|---|---|---|---|---|---|---|
|  |  | 1 | 2 | 3 | 4 | 5 | 1 |
| raw material mixed solution |  |  |  |  |  |  |  |
| MMA | [phr] | 98.9 | 90.4 | 90.4 | 90.4 | 90.4 | 98.9 |
| MA | [phr] | 1.1 | 9.6 | 9.6 | 9.6 | 9.6 | 1.1 |
| OM | [phr] | 0.257 | 0.385 | 0.385 | 0.385 | 0.385 | 0.257 |
| AIBN | [ppm] | 74 | 73 | 73 | 73 | 73 | 74 |
| additive |  |  |  |  |  |  |  |
| stearic acid alcohol | [phr] | — | 0.075 | 0.075 | 0.075 | 0.225 | — |
| stearic acid monoglyceride | [phr] | 0.150 | 0.025 | 0.025 | 0.025 | 0.075 | 0.150 |
| paraffin | [phr] | — | — | — | — | 0.050 | — |
| UV absorber (JF-77) | [phr] | 0.020 | — | — | — | — | 0.020 |
| antioxidant (HP-10) | [phr] | — | 0.010 | 0.010 | 0.010 | — | — |
| state of additive |  | Melt | Melt | Melt | Melt | Melt | Powder |
| liquid addtive strage temp. | [° C.] | 120 | 120 | 140 | 120 | 120 | — |
| Atmosphere in liquid additive preparation tank |  | N$_2$purge | N$_2$purge | N$_2$purge | Air | N$_2$purge | — |
| physical properties of product |  |  |  |  |  |  |  |
| MFR [g/10 min] |  | 2.4 | 20 | 20 | 20 | 22 | 2.4 |
| formability |  | AA | AA | AA | BB | AA | AA |
| number of foreign substances per 300 g |  | 1 | 2 | 2 | 1 | 2 | 10 |
| Additive content |  |  |  |  |  |  |  |
| stearic acid alcohol | [phr] | — | 0.082 | 0.078 | 0.072 | 0.230 | — |
| stearic acid monoglyceride | [phr] | 0.150 | 0.022 | 0.028 | 0.022 | 0.078 | 0.160 |
| paraffin | [phr] | — | — | — | — | 0.050 | — |
| UV absorber (JF-77) | [phr] | 0.020 | — | — | — | — | 0.025 |
| antioxidant (HP-10) | [phr] | — | 0.010 | 0.004 | 0.003 | — | — |

As shown by the results above, the method of the present invention (Examples) can produce a resin composition containing few foreign substances, giving few defective articles, and having excellent optical properties.

The results also show that when the temperature during storage of the liquid additive is not more than 130° C. and nitrogen purge is conducted, the amount of the additive when added to the resin composition is substantially maintained.

When the content of the antioxidant in the pellet-like resin composition in Example 2 (with nitrogen purge) is compared to that in Example 4 (in the air), the content in Example 4 is markedly lower even though the same amount of the antioxidant was added in both examples. This decrease occurred presumably because oxygen and water in the preparation tank caused a phenomenon such as decom- Inhbt: polymerization inhibitor
P: product (resin composition)

The invention claimed is:

1. A method for producing a (meth)acrylic resin composition, the method comprising:
   continuously feeding a raw material solution into a tank reactor, wherein the raw material solution comprises methyl methacrylate, a chain transfer agent and a radical polymerization initiator, and optionally comprises an acrylic acid alkyl ester in a mass ratio of the acrylic acid alkyl ester to the methyl methacrylate of 0/100 to 20/80;
   bulk-polymerizing in the tank reactor at a polymerization conversion ratio of 40 to 70% by mass to obtain a reaction product;

continuously discharging the reaction product from the tank reactor;

heating the discharged reaction product with a heat exchanger;

removing a volatile matter from the heated reaction product;

filtrating a liquid additive through a filter; and adding the filtrated liquid additive to the reaction product from which the volatile matter has been removed.

2. The method according to claim 1, further comprising:
purging an additive preparation tank with an inert gas; and
subsequently melting at least one additive in the additive preparation tank to obtain the liquid additive.

3. The method according to claim 1, further comprising:
storing the liquid additive at not more than 130° C.

4. The method according to claim 1, wherein both of the removing the volatile matter from the reaction product and the adding the filtrated liquid additive to the reaction product are conducted in a vented extruder.

5. The method according to claim 4, wherein the adding the filtrated liquid additive to the reaction product within the vented extruder is conducted at a position closer to a polymer outlet than a front vent closest to the polymer outlet.

6. The method according to claim 1, wherein the raw material solution is prepared by mixing a raw material solution (A) comprising the methyl methacrylate and the chain transfer agent and optionally comprising the acrylic acid alkyl ester with a raw material solution (B) comprising the radical polymerization initiator and methyl methacrylate.

7. The method according to claim 1, wherein the continuously feeding a raw material solution, the bulk-polymerizing, the continuously discharging the reaction product, the heating the discharged reaction product, the removing the volatile matter, the filtrating a liquid additive and the adding the filtrated liquid additive are carried out concurrently.

8. The method according to claim 1, wherein the chain transfer agent is a monofunctional alkylmercaptan.

9. The method according to claim 1, wherein the radical polymerization initiator has a half-life of 0.5 to 120 seconds at a temperature inside the tank reactor.

10. The method according to claim 1, wherein the polymerization initiator has a hydrogen abstraction capacity of not more than 40%.

11. The method according to claim 1, wherein the polymerization initiator is 2,2'-azobis(2-methylpropionitrile), t-hexylperoxy 2-ethylhexanoate, 1,1-bis(t-hexylperoxy)cyclohexane, or dimethyl 2,2'-azobis(2-methylpropionate).

12. The method according to claim 6, wherein the raw material solution (A) comprises 0.1 ppm to 50 ppm of a polymerization inhibitor.

13. The method according to claim 6, wherein the raw material solution (A) has a dissolved oxygen concentration of not more than 50 ppm.

14. The method according to claim 6, wherein the raw material solution (A) has a b* value of −1 to +2.

15. The method according to claim 6, wherein the raw material solution (A) is obtained by mixing methyl methacrylate, the acrylic acid alkyl ester and the chain transfer agent at a predetermined proportion and then bringing the resulting mixture into contact with an inert gas for removal of dissolved oxygen.

16. The method according to claim 15, wherein a ratio of the amount of the raw material solution (A) being fed (kg/h) to the amount of the inert gas being fed ($Nm^3/h$) is less than 0.30.

17. The method according to claim 6, wherein the concentration of the radical polymerization initiator in the raw material solution (B) is not less than 0.01% by mass and less than 4% by mass.

18. The method according to claim 6, wherein the raw material solution (B) comprises 0.1 ppm to 50 ppm of a polymerization inhibitor.

19. The method according to claim 6, wherein the temperature of the raw material solution (B) in the presence of oxygen is maintained at not more than 0° C.

20. The method according to claim 4, wherein the vented extruder is equipped with a breaker plate or a screen at a polymer outlet.

21. The method according to claim 1, wherein the filter has an operating temperature limit of not less than 140° C.

22. The method according to claim 1, wherein a reaction tank in the tank reactor is equipped with a Maxblend stirring device.

23. The method according to claim 1, wherein a polymerization conversion ratio of the bulk polymerization reaches 40 to 70% by mass.

24. The method according to claim 1, wherein a temperature of a liquid in a reactor tank in the tank reactor is 100° C. to 170° C.

25. The method according to claim 1, wherein an amount of a liquid in a reaction tank in the tank reactor is not less than 1/4 the capacity of the reaction tank.

26. The method according to claim 1, wherein a water content of a liquid in the tank reactor is not more than 1000 ppm.

* * * * *